(No Model.)
W. J. BARRON.
TYPE WRITING MACHINE.
No. 514,807.      Patented Feb. 13, 1894.
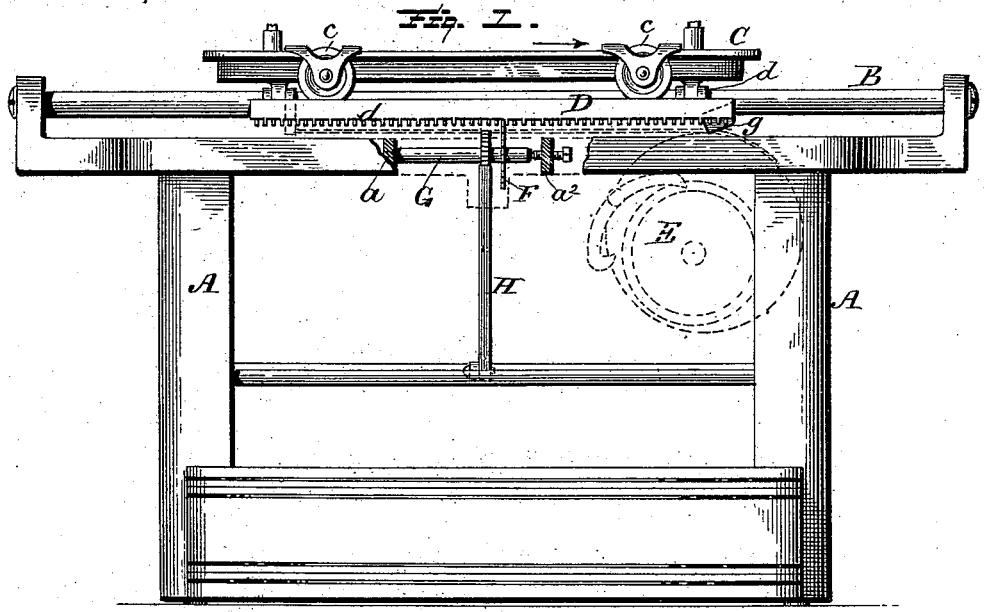
Witnesses
L. C. Hills
C. C. Schiller, Jr.
Inventor
Walter J. Barron
By his Attorney
E. E. Masson

UNITED STATES PATENT OFFICE.

WALTER J. BARRON, OF NEW YORK, N. Y.

TYPE-WRITING MACHINE.

SPECIFICATION forming part of Letters Patent No. 514,807, dated February 13, 1894.

Application filed March 31, 1890. Serial No. 346,011. (No model.)

*To all whom it may concern:*

Be it known that I, WALTER J. BARRON, a citizen of the United States, residing at New York city, in the county of New York, State of New York, have invented certain new and useful Improvements in Type-Writing Machines, of which the following is a specification, reference being had therein to the accompanying drawings.

My invention relates to type-writing machines, mainly of the class known as "the Remington" and the objects of my improvement are to provide said machines with a simple and durable dog of peculiar construction to engage with and arrest the rack of the paper carriage after each advance step thereof. I attain these objects by the means of a circular dog in connection with a rack and means to advance the same as hereinafter described and pointed out in the claims.

In the accompanying drawings,—Figure 1 is a rear view of a portion of a Remington type-writing machine showing my invention attached thereto. Fig. 2 is a longitudinal vertical section of a portion of the same. Fig. 3 represents on an enlarged scale a top view of one end of the feed rack and a rear view of the circular dog its shaft and ratchet wheel. Fig. 4 is a vertical section on an enlarged scale of a portion of the frame and shaft carrying the circular dog and its operating mechanism.

In said drawings A represents the frame of the type writing machine, B, one of the guide rods for the paper carriage C, the latter being provided with wheels $c$ to travel upon the guide rod, is hinged as usual to said guide rod, and at its hinge is connected at $d^2$ with the rack D of the carriage, said rack having arms $d^3$ adjacent to its ends that are perforated to receive the guide rod B.

The carriage is connected as usual, preferably by means of a strap with a loosely mounted fusee or casing, E, inclosing a spring, (not shown,) by which said casing is rotated and the carriage advanced in the direction of the arrow.

To cause the carriage and rack to advance only the distance of one tooth at a time under the impulse of its operating spring as soon as a finger key or space key has been depressed and released, a rotatable dog F, is mounted upon a shaft G, retained in bearings $a$ and $a^2$ secured to or formed integral with the frame A. To allow for wear of the shaft in its bearings one end of said shaft is preferably conical and receives in a corresponding recess in the bearing $a$, while the opposite end of the shaft receives the conical point of screw passing through the bearing $a^2$. The dog F is in the form of a thin disk of steel having upon its periphery a series of teeth $f$ at a sufficient distance apart so that the spaces $f^2$ between will permit the passage of the teeth $d$ pendent in two parallel rows from the bottom of the rack, the teeth of each row being arranged in a staggered order from those in the adjacent row so that at each release of the dog the rack and the carriage will be allowed to advance one half the distance between two of the teeth in one row. To cause the teeth of the dog to engage properly with the outer row of cogs on the rack after the operator has slid the carriage back to print a new line, one end of the rack is provided with a small plate $g$ arranged as a plowshare with one end secured to the inner side of the rack and the other end divergent therefrom and also slightly inclined downward, to plow its way in one of the spaces $f^2$ of the dog wheel F and set one of its teeth, $f$, opposite the outer row of teeth on the rack and arrest the latter until released by the operator after one of the finger keys has been acted upon.

To rotate the shaft G there is mounted thereon a ratchet wheel $g^2$, and the latter is rotated by means of pawl H one end of which is retained in engagement with said ratchet wheel and the opposite end is connected with the transverse universal bar $k$ that is controlled by the space lever or by either one of the type key levers K; the connection being made preferably through an arm $h$ attached to a rod $h^2$ pivoted to the frame A and a connecting rod $h^3$, one end of said connecting rod being pivoted to the universal bar $k$ while the opposite end is pivoted to the arm $h$. The lower end of the pawl H is also pivoted to the arm $h$ while its upper end is retained in engagement with the ratchet wheel by means of a spring $i$, which is preferably a flat spring having one end pressing against the back of the pawl while its opposite end is secured to the frame A. The pawl H as arranged in connection with the spring $i$ acts not only as a propeller for the ratchet wheel but also as a brake therefor, as the friction of the pawl against the ratchet wheel prevents it from acquiring a momentum under the impulse of the pawl beyond the plane where it has advanced it. A retaining pawl $l$ is also made to engage with ratchet wheel to prevent any back motion of the latter while the pawl H is being retracted by the operator pressing upon the space key or the key levers. When the latter are released a spring as the spring $k^2$ pressing under the universal box $k$ again advances the pawl H, its ratchet wheel and the dog wheel F and permits the rack to advance the space between its staggered teeth. As said dog wheel revolves only in one direction the teeth on said wheel are not liable to become out of order by ordinary wear; they become only smoother, and as there are many teeth the wear is less than one twentieth of that experienced on machines having a single oscillating dog.

Having now fully described my invention, I claim—

1. The combination of the paper carriage and rack of a type-writing machine with a revolving dog-wheel having less thickness at the periphery thereof than the space between two teeth of the rack and teeth to engage with the teeth of said rack substantially as described.

2. The combination of the frame of a type-writing machine its paper carriage and rack with a revolving dog wheel having less thickness than the space between two teeth of the rack and teeth to engage with said rack, a ratchet wheel upon the shaft of said dog wheel, a pawl to engage with said ratchet wheel and means to connect said pawl with the universal bar of the machine substantially as described.

3. The combination of the frame of a type writing machine, its paper carriage and rack, with a revolving dog wheel having less thickness adjacent to its periphery than the space between two consecutive teeth of the rack and teeth to engage with said rack, a ratchet wheel upon the shaft of said dog wheel, a pawl, and a spring pressing against it and means to operate said pawl, substantially as described.

4. The combination of a paper carriage and its rack, a revolving dog wheel having teeth to engage with the teeth of said rack, and a plate $g$ carried by said rack, and divergent therefrom, substantially as and for the purpose described.

5. In a type-writing machine, the combination with a power-driven carriage, of a toothed-bar or rack connected to travel therewith, and a ratchet-toothed escapement-wheel arranged to rotate at right angles to the path of travel of the rack, the teeth of the rack and the ratchet-toothed escapement-wheel being adapted to engage directly with one another and the teeth of one member being arranged in a single row and the teeth of the other in a double row, substantially as and for the purpose described.

6. In a type-writing machine, the combination with a power driven carriage, of a toothed-bar or rack connected to travel therewith, and a ratchet-toothed escapement-wheel arranged to rotate at right angles to the path of travel of the rack, the teeth of the rack and the ratchet-toothed escapement-wheel being adapted to engage directly with one another and the teeth of one member being arranged in a single row and the teeth of the other in a double row and alternately, substantially as and for the purpose described.

7. In a type-writing machine, the combination with a power-driven carriage, of a toothed bar or rack hinged thereto, a ratchet-toothed escapement-wheel arranged to rotate at right angles to the path of travel of the rack, the teeth of the rack and the ratchet-toothed escapement-wheel being adapted to engage directly with one another and the teeth of one member being arranged in a single row and the teeth of the other in a double row and alternately, and a pawl and ratchet wheel for rotating the toothed escapement-wheel; substantially as and for the purpose described.

8. In a type-writing machine, the combination with a power-driven carriage, of a toothed bar or rack hinged thereto, a ratchet-toothed escapement-wheel arranged to rotate at right angles to the path of travel of the rack, the teeth of the rack and the ratchet-toothed escapement-wheel being adapted to engage directly with one another and the teeth of one member being arranged in a single row and the teeth of the other in a double row and alternately, a ratchet-wheel, a driving pawl, a spring actuated rocker arm, and means for moving the same, substantially as and for the purpose described.

9. The combination with a power-driven carriage, of a rack-bar having two sets of teeth arranged alternately, and a wheel or disk having a single row or set of teeth, substantially as described.

In testimony whereof I affix my signature in presence of two witnesses.

WALTER J. BARRON.

Witnesses:
 A. V. MANTLE,
 M. M. MONSTERY.